(12) United States Patent
Zhai et al.

(10) Patent No.: US 10,522,191 B2
(45) Date of Patent: Dec. 31, 2019

(54) CONTROLLING FAN SPEED BASED ON HARD DISK ASSEMBLY POSITION

(71) Applicant: EMC IP Holding Company LLC, Hopkinton, MA (US)

(72) Inventors: Haifang Zhai, Shanghai (CN); Yujie Zhou, Shanghai (CN); Hendry Xiaoping Wu, Shanghai (CN); David Dong, Shanghai (CN); Qingqiang Guo, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/711,020

(22) Filed: Sep. 21, 2017

(65) Prior Publication Data

US 2018/0090180 A1 Mar. 29, 2018

(30) Foreign Application Priority Data

Sep. 23, 2016 (CN) .......................... 2016 1 0847711

(51) Int. Cl.
*G11B 33/12* (2006.01)
*G11B 33/14* (2006.01)
*G06F 1/20* (2006.01)

(52) U.S. Cl.
CPC .............. *G11B 33/144* (2013.01); *G06F 1/20* (2013.01); *G11B 33/125* (2013.01); *G11B 33/128* (2013.01); *G11B 33/142* (2013.01)

(58) Field of Classification Search
CPC ... G11B 33/125; G11B 33/128; G11B 33/142; G06F 1/20

USPC .......................... 360/97.13; 361/679.48, 695
See application file for complete search history.

(56) References Cited

U.S. PATENT DOCUMENTS

| 7,013,336 | B1 * | 3/2006 | King .................... G06F 11/3034 709/224 |
| 7,279,856 | B1 | 10/2007 | Sullivan et al. |
| 7,321,948 | B1 | 1/2008 | Sullivan et al. |
| 7,809,964 | B1 | 10/2010 | Strickland et al. |
| 2004/0070932 | A1 * | 4/2004 | Dobbs ..................... G06F 1/206 361/679.48 |
| 2007/0079152 | A1 * | 4/2007 | Winick .................... G11C 5/04 713/300 |
| 2008/0316704 | A1 * | 12/2008 | Vinson ..................... G06F 1/20 361/695 |

(Continued)

FOREIGN PATENT DOCUMENTS

| CN | 101667054 A | 3/2010 |
| CN | 103163990 A | 6/2013 |

(Continued)

*Primary Examiner* — Jefferson A Evans
(74) *Attorney, Agent, or Firm* — BainwoodHuang

(57) ABSTRACT

Embodiments of the present disclosure provide a method for managing a storage device and a storage device, the storage device including a chassis and a hard disk assembly. The method comprises: receiving a signal indicating a position of the hard disk assembly relative to the chassis, the hard disk assembly being slidably coupled to the chassis, and the signal being generated by an electromechanical element disposed on the hard disk assembly; and controlling a rotating speed of a fan based at least in part on the signal, the fan being disposed in the chassis and configured to blow wind to the hard disk assembly.

19 Claims, 13 Drawing Sheets

(56) References Cited

U.S. PATENT DOCUMENTS

| | | | | |
|---|---|---|---|---|
| 2013/0155608 A1* | 6/2013 | Tang | .......................... | G06F 1/20 |
| | | | | 361/679.48 |
| 2013/0229765 A1* | 9/2013 | Weng | ...................... | G06F 1/206 |
| | | | | 361/679.33 |
| 2013/0258521 A1* | 10/2013 | Yang | .................... | G11B 33/144 |
| | | | | 360/97.13 |
| 2015/0334880 A1* | 11/2015 | Best | .................. | H05K 7/20763 |
| | | | | 361/679.47 |
| 2017/0122647 A1* | 5/2017 | Burd | ...................... | B64D 11/04 |
| 2017/0156238 A1* | 6/2017 | Li | .......................... | G05B 15/02 |
| 2017/0336838 A1* | 11/2017 | Ragupathi | ............... | G06F 1/206 |
| 2019/0235449 A1* | 8/2019 | Slessman | ................. | F24F 11/00 |

FOREIGN PATENT DOCUMENTS

| | | |
|---|---|---|
| CN | 103744496 A | 4/2014 |
| CN | 105334935 A | 2/2016 |

\* cited by examiner

CONTROLLING FAN SPEED BASED ON HARD DISK ASSEMBLY POSITION

RELATED APPLICATIONS

This application claim priority from Chinese Patent Application Number CN201610847711.1, filed on Sep. 23, 2016 at the State Intellectual Property Office, China, titled "A STORAGE DEVICE AND METHOD FOR MANAGING STORAGE DEVICE" the contents of which is herein incorporated by reference in its entirety.

FIELD

Embodiments of the present disclosure generally relate to the field of storage, and more specifically, to a storage device and a method for managing a storage device.

BACKGROUND

With development of data storage technologies, various kinds of data storage devices already can provide a user with an increasingly high data storage capacity, and data access speed has also been greatly improved. Currently, several kinds of hard disk array-based data storage devices have been developed to enhance data reliability. A conventional storage device includes a chassis and a hard disk assembly that can be drawn out of and pushed into the chassis. When the user wants to extend the hard disk array in the hard disk assembly or replace a hard disk in the hard disk array, the hard disk drawer that bears the hard disk array needed to be drawn out of the chassis. In this case, a distance between a fan in the chassis and the hard disk assembly will be enlarged, which affects heat dissipation performance of the storage device.

SUMMARY

Embodiments of the present disclosure provide a storage device and a method for managing a storage device.

According to a first aspect of the present disclosure, there is provided a method for managing a storage device, the storage device including a chassis and a hard disk assembly. The method comprising: receiving a signal indicating a position of the hard disk assembly relative to the chassis, the hard disk assembly being slidably coupled to the chassis, and the signal being generated by an electromechanical element disposed on the hard disk assembly; and controlling a rotating speed of a fan based at least in part on the signal, the fan being disposed in the chassis and configured to blow wind to the hard disk assembly.

According to a second aspect of the present disclosure, there is provided a storage device. The storage device comprises: a chassis; a hard disk assembly that is slidably coupled to the chassis and has an electromechanical element disposed thereon, the electromechanical element being configured to generate a signal indicating a position of the hard disk assembly relative to the chassis; a fan disposed in the chassis and configured to blow wind to the hard disk assembly; and a processor configured to receive the signal and control a rotating speed of the fan based at least in part on the signal.

By adopting the technical solution of the embodiments of the present disclosure, the rotating speed of the fan can be effectively controlled when at least a part of the hard disk assembly is located outside of the chassis, thereby enhancing stability of the storage device.

Providing of the Summary section is to introduce selection of concepts that will be further described in the detailed description below. The Summary section has no intention to identify key features or major features of the present disclosure or limit the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the drawings, like reference numerals usually represent like components.

DETAILED DESCRIPTION OF EMBODIMENTS

Figure 1:
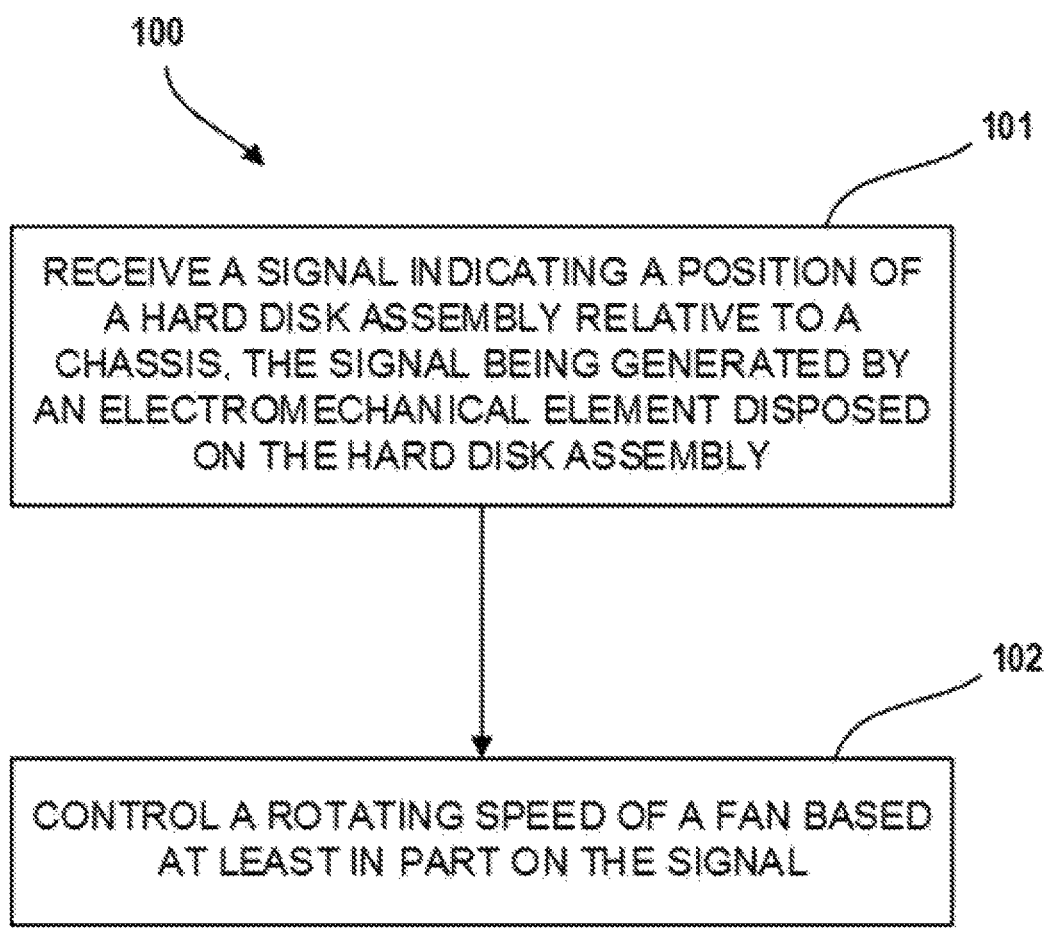
FIG. 1 is a flow diagram of a method for managing a storage device according to embodiments of the present disclosure.

Principles of example embodiments disclosed herein will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment" The term "another embodiment" is to be read as "at least another embodiment." Terms like "first" and "second" may refer to different or same objects. Other explicit and implicit meanings may also be included hereinafter.

As described above, when the hard disk assembly is drawn out of the chassis, the distance between the fan and the hard disk assembly is enlarged, which will affect heat dissipation performance of the storage device. In this case, for the hard disk remaining within the chassis, such impact might be relatively small, because the wind blown out by the fan can be restricted by the chassis so as to reach the hard disk assembly within the chassis along a given direction. However, for the hard disk that has been drawn out of the chassis, its dissipation condition will become bad, because the wind will not advance along the given direction after being blown out of the chassis. Therefore, the hard disk that has been drawn out of the chassis can hardly be effectively cooled.

In order to solve the above and other potential problems, exemplary embodiments of the present disclosure provide a solution for managing a storage device. In some embodiments, the solution dynamically controls the rotating speed of the fan according to the position of the hard disk assembly relative to the chassis so as to guarantee that the hard disk assembly can also be cooled effectively when at least a part of the hard disk assembly is outside of the chassis.

FIG. 1 is a flow diagram of a method 100 for managing a storage device according to an embodiment of the present disclosure. The storage device includes a chassis and a hard disk assembly. The hard disk assembly is slidably coupled to the chassis. It should be understood that the method 100 may also include additional steps not shown and/or may omit the illustrated steps. The scope of the present disclosure is not limited to this aspect.

As illustrated in FIG. 1, at 101, a signal indicating a position of the hard disk assembly relative to the chassis is received, the signal being generated by an electromechanical element disposed on the hard disk assembly; and at 102, a rotating speed of a fan is controlled based at least in part on the received signal, the fan being disposed within the chassis and configured to blow wind to the hard disk assembly.

In other words, according to the embodiments of the present disclosure, the rotating speed of the fan may be dynamically adjusted based on the position of the hard disk assembly relative to the chassis. As will be detailed hereinafter, in some embodiments, when the hard disk assembly is drawn out of the chassis and thus away from the fan, the rotating speed of the fan may be increased to guarantee the cooling effect. On the other hand, when the hard disk assembly is pushed into the chassis and closer to the fan, the rotating speed of the fan may be decreased to save energy while guaranteeing the cooling effect. In some embodiments, various relevant factors such as ambient temperature may also be considered to achieve a better balance between energy conservation and cooling effect. Hereinafter, exemplary embodiments of the present disclosure will be described with reference to the structure of the device.

Figure 2:
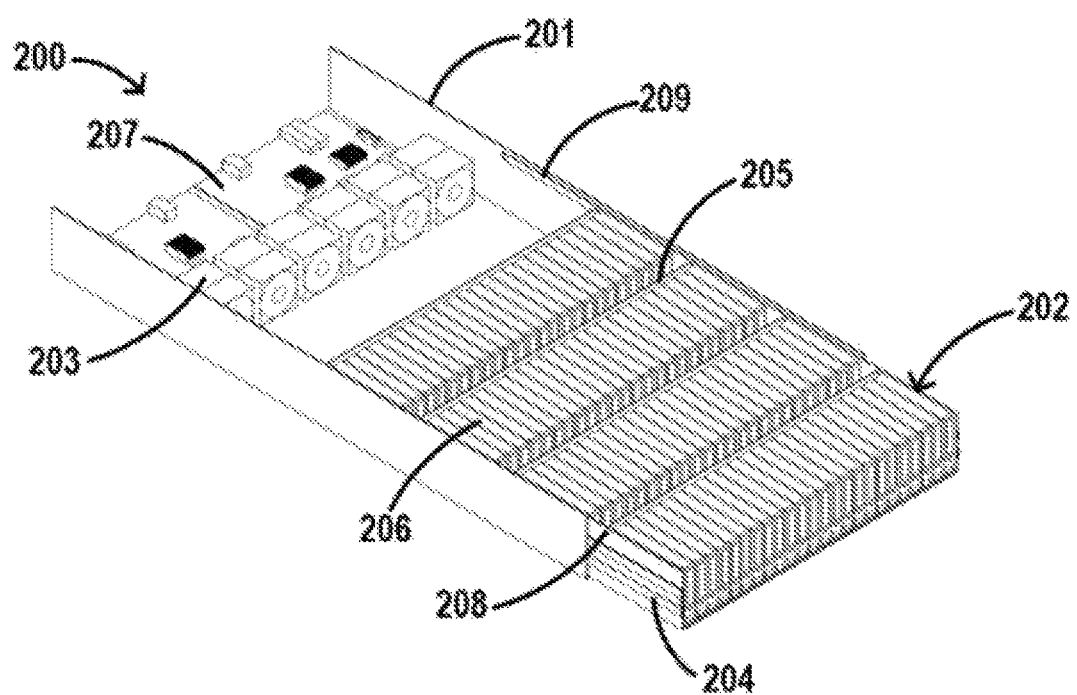
FIG. 2 is a structural diagram of a storage device according to an embodiment of the present disclosure.
Figure 3:
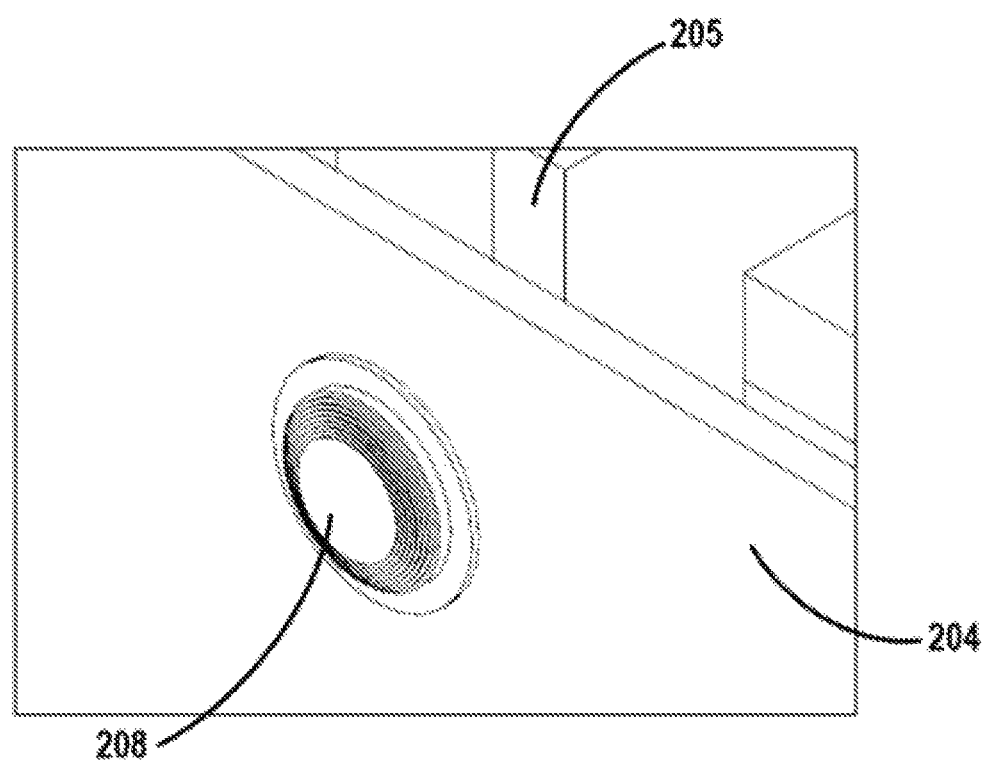
FIG. 3 illustrates an arrangement of elastic buttons according to an embodiment of the present disclosure.
Figure 4:
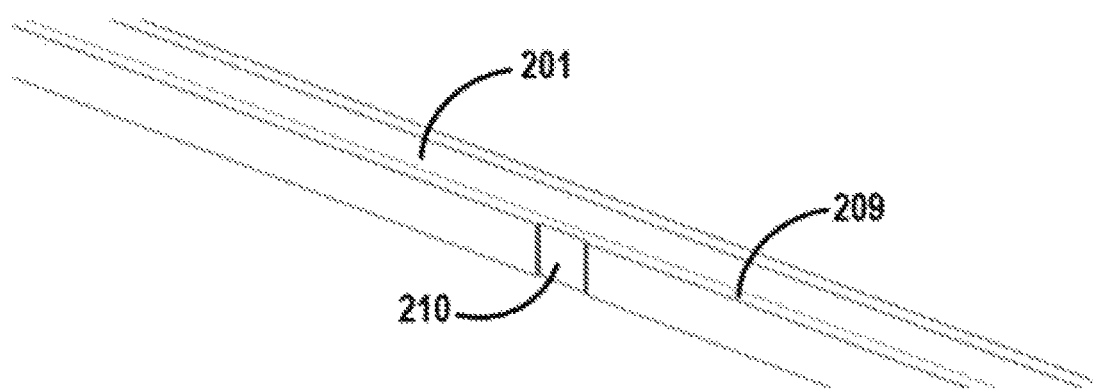
FIG. 4 illustrates an arrangement of metal stripes according to an embodiment of the present disclosure.
Figure 5A:
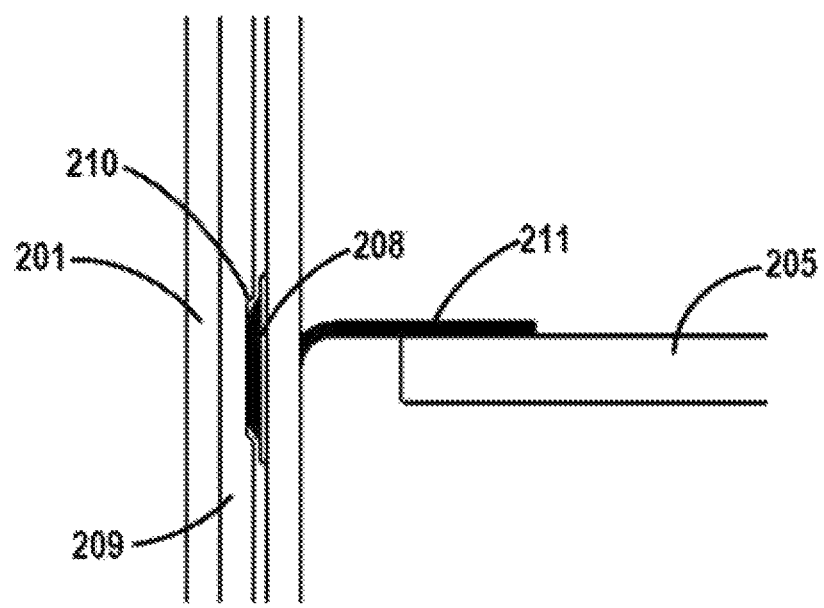
FIGS. 5A-5C are state diagrams of the elastic buttons when a hard disk assembly is drawn out of a chassis.
Figure 5B:
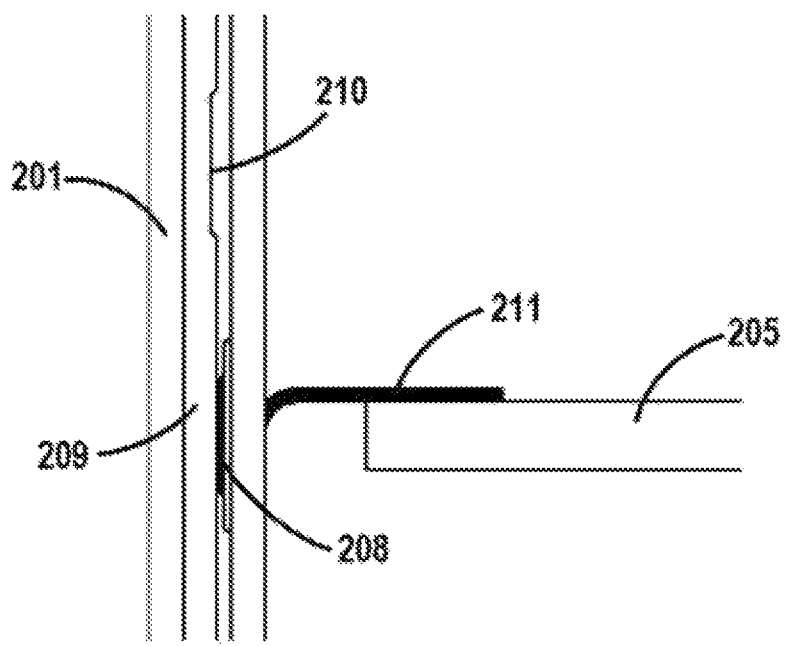
Figure 5C:
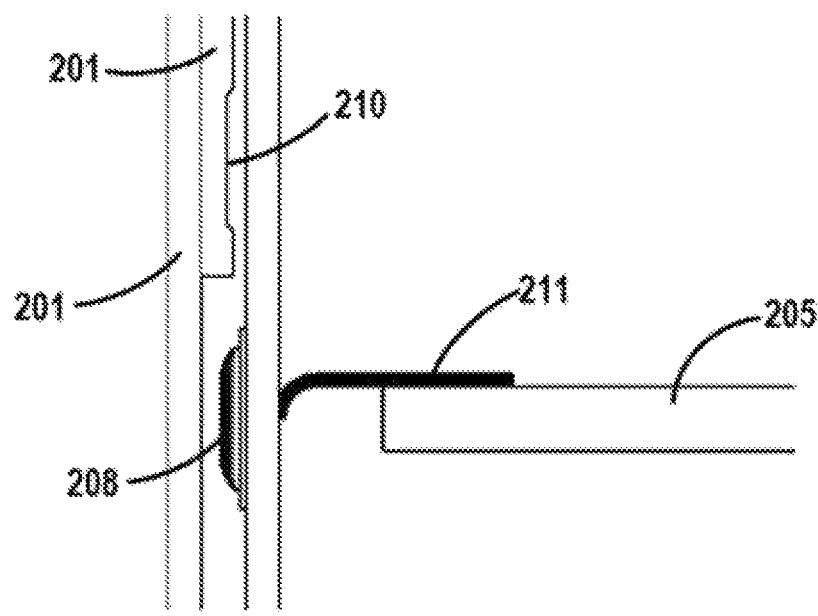

FIG. 2 is a structural diagram of a storage device 200 according to an embodiment of the present disclosure, FIG. 3 illustrates an arrangement of elastic buttons 208 according to an embodiment of the present disclosure, FIG. 4 illustrates an arrangement of metal stripes 209 according to an embodiment of the present disclosure, FIGS. 5A-5C are state diagrams of the elastic buttons 208 when the hard disk assembly 202 is drawn out of the chassis 201, and FIGS. 6A-6E illustrate schematic process of drawing the hard disk assembly 202 out of the chassis 201.

As shown in FIG. 2, the storage device 200 includes a chassis 201, a hard disk assembly 202, a fan 203, and an input/output (I/O) interface 207. The hard disk assembly 202 is slidably coupled to the chassis 201. Such configured, the hard disk assembly 202 may be drawn out and pushed in relative to the chassis 201. The hard disk assembly 202 shown in FIG. 2 is in a state of being partially drawn out of the chassis 201. The fan 203 is disposed in the chassis 201 to blow wind towards the hard disk assembly 202, so as to cool hard disks 206 in the hard disk assembly 202. The I/O interface 207 is used for communicating with an external device.

As shown in FIG. 2, in some embodiments, the hard disk assembly 202 includes a hard disk drawer 204 and a plurality of circuit boards 205 disposed in the hard disk drawer 204 at intervals. The plurality of circuit boards 205 may be used for inserting rows of hard disks 206 to form the hard disk array 202. FIG. 2 shows four circuit boards 205 to insert four rows of hard disks 206. However, in other embodiments, the hard disk assembly 202 may include more or less circuit boards 205 to insert more or less hard disks 206.

As illustrated in FIGS. 2 and 3, in some embodiments, on a side wall of the hard disk drawer 204 is provided an elastic button 208 for generating a signal indicating a position of the hard disk assembly 202 relative to the chassis 201. In conjunction with FIGS. 5A-5C, the elastic button 208 is electrically connected to the circuit board 205 via a wire 211. During drawing the hard disk assembly 202 out of the chassis 201 and pushing the hard disk assembly 202 into the chassis 201, the elastic button 208 may switch between contacting and non-contacting with the chassis 201. If the elastic button 208 contacts the chassis 201, the elastic button 208 may provide an earth potential to the circuit board 205, and then the circuit board 205 will produce a first signal indicating that the elastic button 208 contacts the chassis 201. If the elastic button 208 does not contact the chassis 201, the elastic button 208 will be in a floating state, and then the circuit board 205 will produce a second signal indicating that the elastic button 208 does not contact the chassis 201.

The position of the hard disk assembly 202 relative to the chassis 201 may be determined through the first signal and the second signal. Therefore, the first signal and the second signal may be used as signals for indicating the position of the hard disk assembly 202 relative to the chassis 201 as discussed above. In some embodiments, the first signal and the second signal may be represented by a one-digit signal, respectively. For example, the first signal may be represented by logic 0, while the second signal may be represented by logic 1. In other ways, the first signal and the second signal may also be represented by other manners, e.g., a multi-digit signal or an analog signal, etc.

As illustrated in FIG. 2, in some embodiments, at least one elastic button 208 may be provided for each circuit board 205. These elastic buttons 208 are disposed at positions corresponding to respective circuit boards 205 on the side wall of the hard disk drawer 204. For example, for each circuit board 205, elastic buttons 208 may be disposed on two opposite side walls of the hard disk drawer 204. For example, one elastic button 208 is disposed at a position corresponding to one end of the circuit board 205, while the other elastic button 208 is disposed at a position corresponding to the other end of the circuit board 205.

As illustrated in FIGS. 2 and 4, in some embodiments, on an inner wall of the chassis 201 may be provided metal stripes 209. Notches 210 corresponding to the elastic buttons 208 are disposed on the metal stripes 209. In some implementations, four elastic buttons 208 are disposed on each of two side walls of the hard disk drawer 204, respectively. Correspondingly, one metal stripe 209 is disposed on each of two opposite inner walls of the chassis 201, respectively, and four notches 210 are disposed on each metal stripe 209. In this way, when drawing or pushing the hard disk assembly 202 out of or into the chassis 201, cooperation between the elastic buttons 208 and the notches 210 can prompt the operator the position of the hard disk assembly 202 relative to the chassis 201 so as to facilitate the operator to understand in real time a drawing-out state of the hard disk assembly 202.

In case that the metal stripes 209 are disposed on the inner wall of the chassis 201, the elastic button 208 may switch among the three states shown in FIGS. 5A-5C. As illustrated in FIG. 5A, when the elastic button 208 is located in the notch 210, the elastic button 208 contacts the metal stripes 209, such that the elastic button 208 may provide the earth potential to the circuit board 205. As illustrated in FIG. 5B, when the elastic button 208 is located outside of the notch 210 and contacts the metal stripes 209, the elastic button 208 may still provide the earth potential to the circuit board 205. As illustrated in FIG. 5C, when the elastic button 208 does not contact the metal stripes 209, the elastic button 208 will be in a floating state.

Figure 6A:
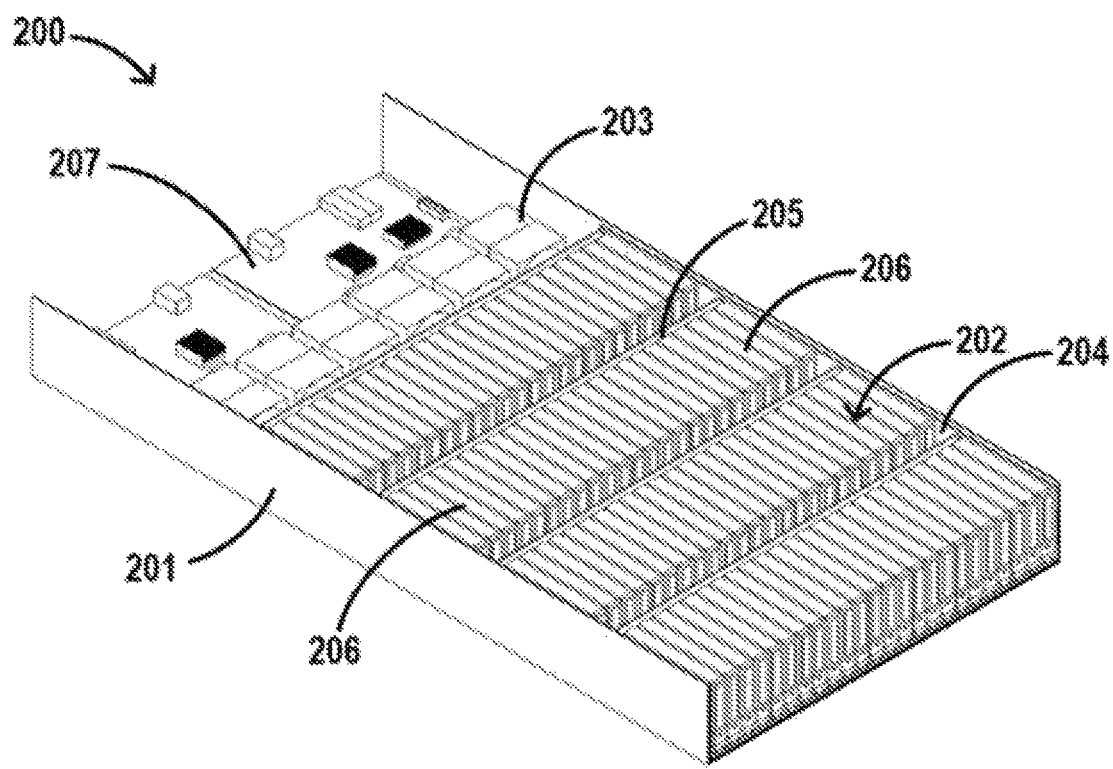
FIGS. 6A-6E illustrate exemplary process of drawing a hard disk assembly out of a chassis.

Hereinafter, an exemplary process of generating a signal indicating a position of the hard disk assembly 202 relative to the chassis 201 will be described with reference to FIGS. 6A-6B. FIG. 6A shows a scenario in which the hard disk assembly 202 is completely located within the chassis 201. At this point, four elastic buttons 208 disposed on one side wall of the hard disk drawer 204 are all in contact with the metal stripes 209, and the four elastic buttons 208 are located in the corresponding notch 201, respectively. Therefore, the four circuit boards 205 may generate four logic 0 signals, i.e., the produced signal for indicating the position of the hard disk assembly 202 relative to the chassis 201 is 0000.

Figure 6B:
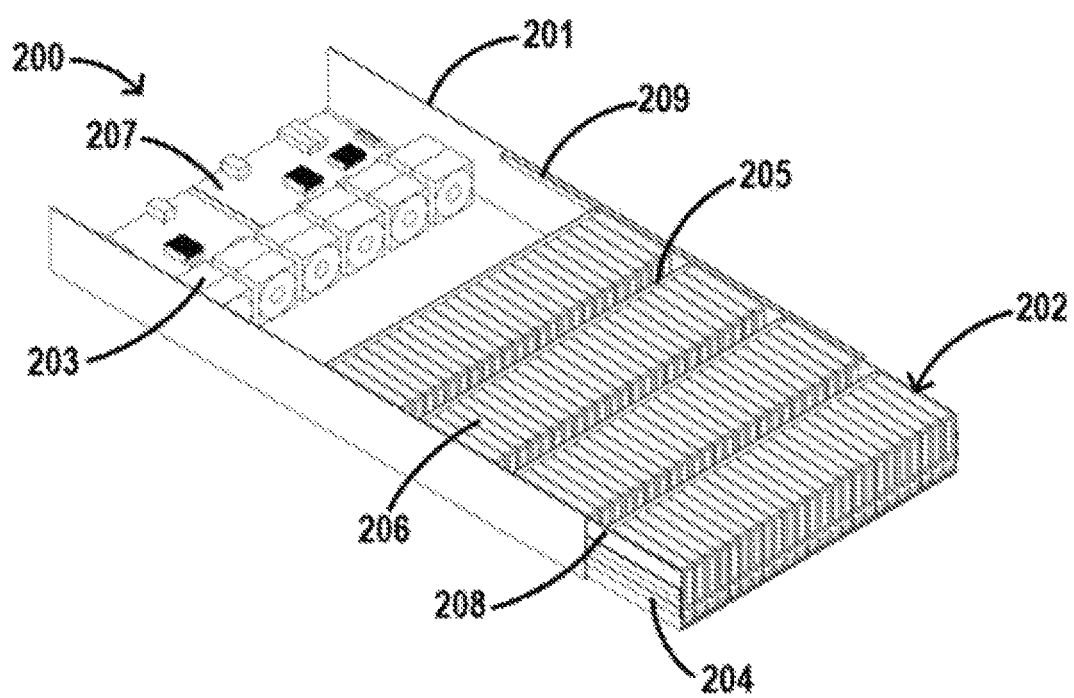

FIG. 6B shows a scenario in which one row of hard disks 206 in the hard disk assembly 202 are drawn out of the chassis 201. At this point, three elastic buttons 208 contact the metal stripes 209, while the remaining one elastic button 208 does not contact the metal stripes 209. Therefore, the four circuit boards 205 may produce three logic 0 signals and one logic 1 signal, i.e., the produced signal for indicating the position of the hard disk assembly 202 relative to the chassis 201 is 0001.

Figure 6C:
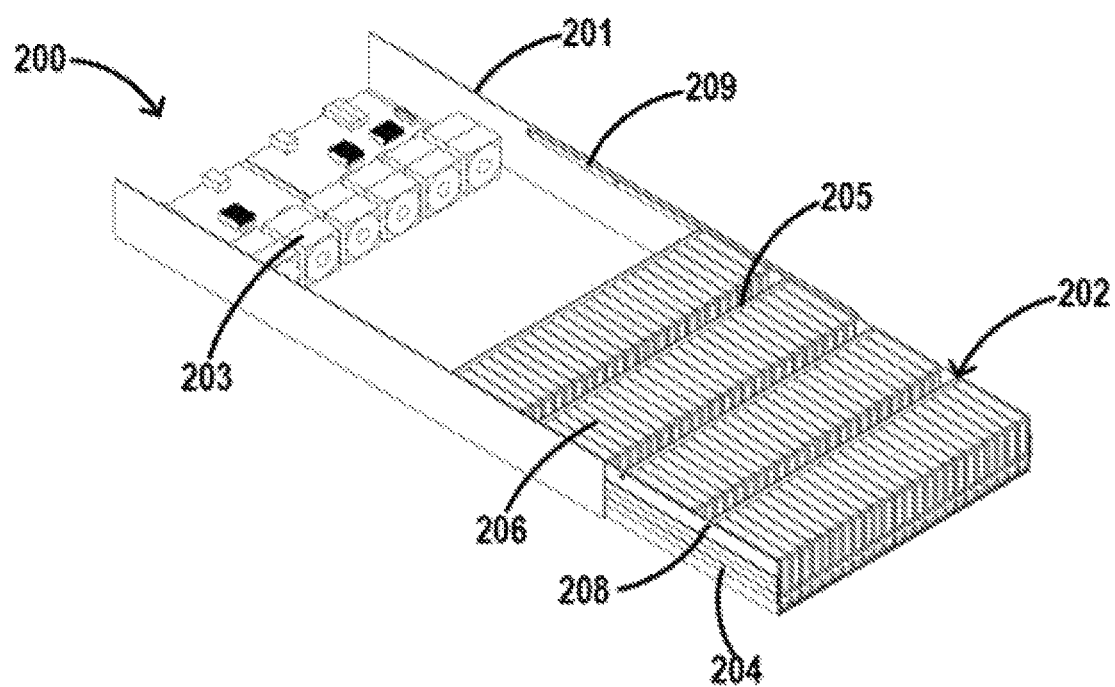

FIG. 6C shows a scenario in which two rows of hard disks 206 in the hard disk assembly 202 are drawn out of the chassis 201. At this point, two elastic buttons 208 contact the metal stripes 209, while the other two elastic buttons 208 do not contact the metal stripes 209. Therefore, the four circuit boards 205 may produce two logic 0 signals and two logic 1 signals, i.e., the produced signal for indicating the position of the hard disk assembly 202 relative to the chassis 201 is 0011.

Figure 6D:
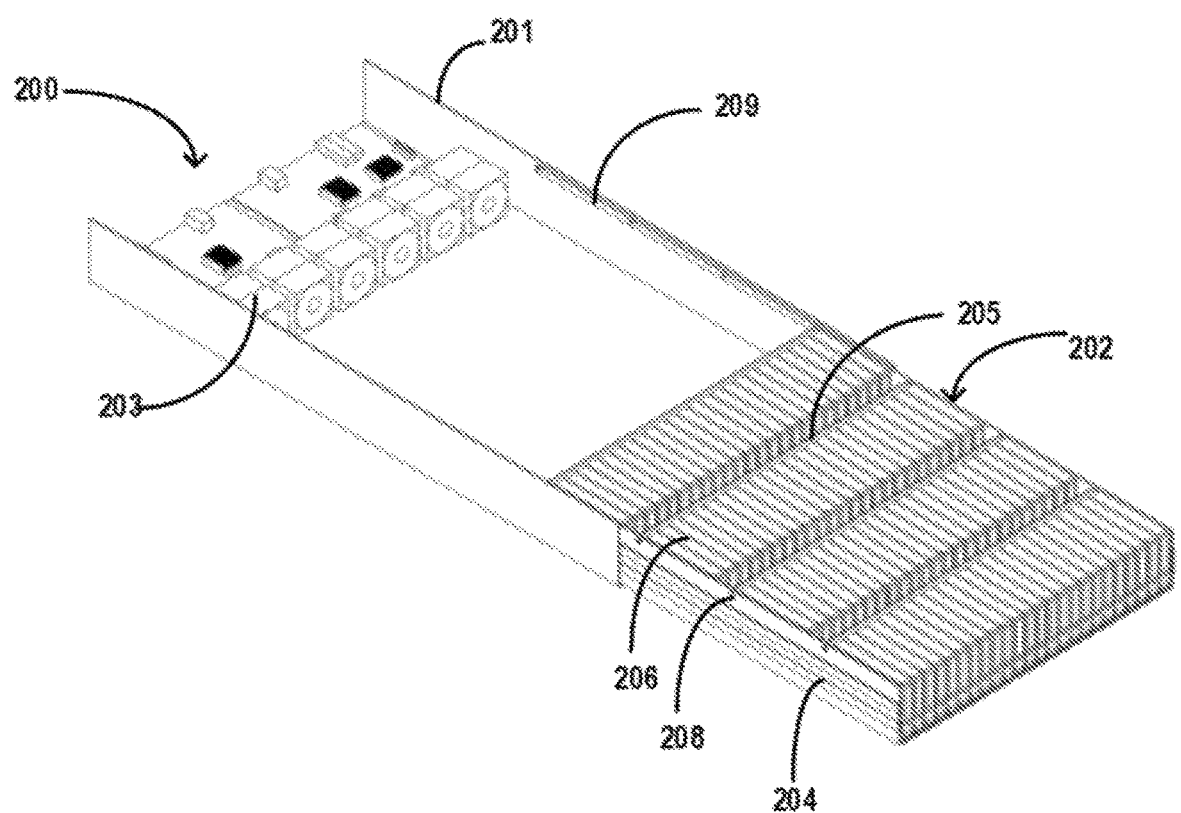

FIG. 6D shows a scenario in which three rows of hard disks 206 in the hard disk assembly 202 are drawn out of the chassis 201. At this point, one elastic button 208 contacts the metal strip 209, while the other three elastic button 208 do not contact the metal strip 209. Therefore, four circuit boards 205 may produce one logic 0 signal and three logic 1 signals, i.e., the produced signal for indicating the position of the hard disk assembly 202 relative to the chassis 201 is 0111.

Figure 6E:
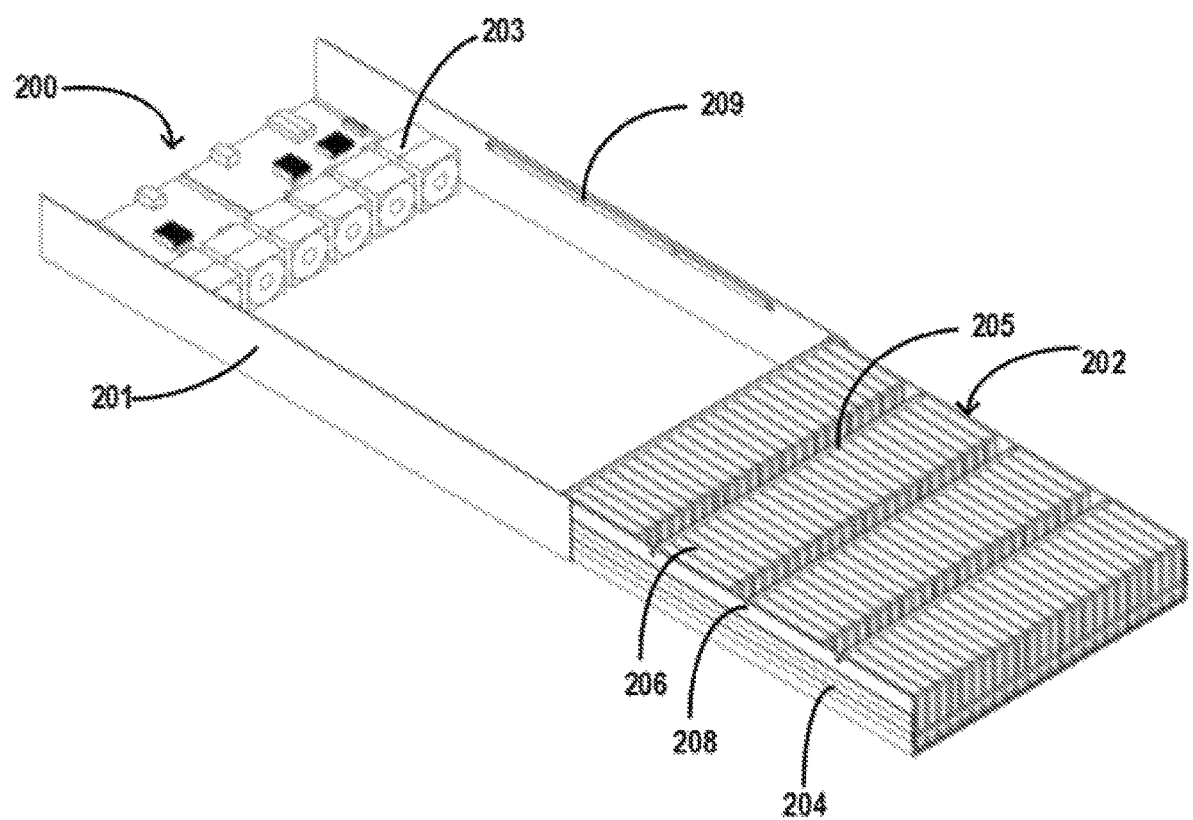

FIG. 6E shows a scenario in which four rows of hard disks 206 in the hard disk assembly 202 are all drawn out of the chassis 201. At this point, none of the four elastic buttons 208 contacts the metal strip 209. As a result, the four circuit boards 205 may produce 4 logic 1 signals, i.e., the produced signal for indicating the position of the hard disk assembly 202 relative to the chassis 201 is 1111.

Figure 7:
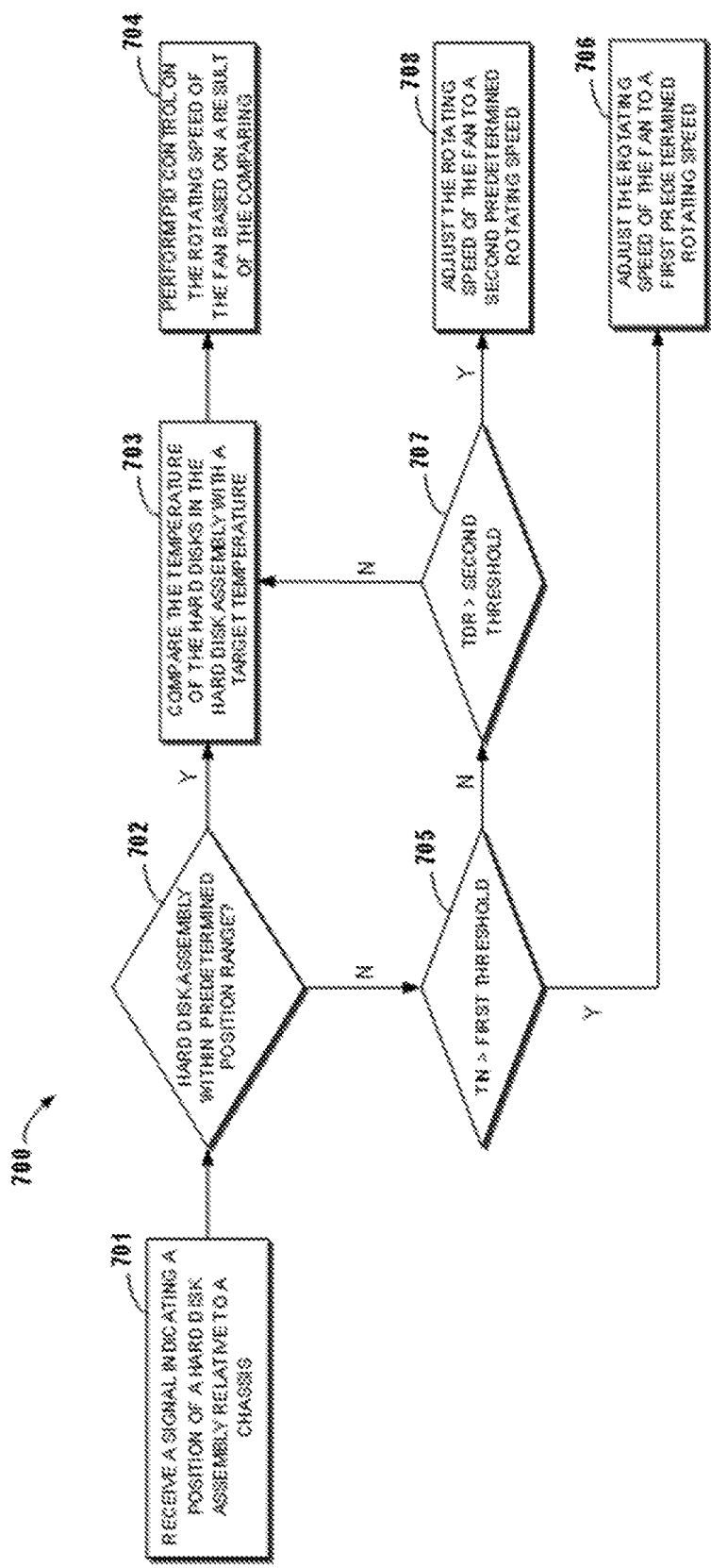
FIG. 7 is a flow diagram of an exemplary implementation of a method for managing a storage device according to the present disclosure.

FIG. 7 is a flow diagram of an exemplary implementation of a method 700 for managing a storage device according to the present disclosure. Specifically, FIG. 7 shows an exemplary process of dynamically adjusting the rotating speed of the fan. At 701, a signal indicating a position of the hard disk assembly 202 relative to the chassis 201 is received. Only as an example, in some embodiments, the signal may be any of the four-digit signals 0000, 0001, 0011, and 1111 produced by the elastic buttons 208 in the embodiments described above with reference to FIGS. 6A-6E. In some other embodiments, the signal can be a digital signal with more or less bits. In other embodiments, the signal may be an analog signal.

At 702, it is determined whether the hard disk assembly 202 is within a predetermined position range. The predetermined position range is used for indicating whether the hard disk assembly 202 has been drawn out for a predetermined distance from the chassis. In some embodiments, if the hard disk assembly 202 is within the predetermined position range, the rotating speed of the fan 203 may be substantially not adjusted. In some other embodiments, if the hard disk assembly 202 is located beyond the predetermined position range, the rotating speed of the fan 203 may be increased to thereby guarantee the cooling effect. In other embodiments, various relevant factors such as a temperature of the hard disks may be considered so as to achieve a good balance between energy conservation and cooling effect. In the example shown in FIGS. 6A-6E, the predetermined range refers to a corresponding position range when the received signal is 0000 or 0001. In this case, the hard disk assembly 202 has not been drawn out of the chassis 201 yet or only one row of hard disks 206 are completely drawn out of the chassis 201.

At 703, in response to the read signal indicates that the hard disk assembly 202 is located within a predetermined position range, the temperature $T_{DR}$ of the hard disks in the hard disk assembly 202 is compared with a target temperature; and at 704, the rotating speed of the fan 203 is subjected to PID (Proportion-Integration-Differentiation) control based on a result of the comparing between the temperature $T_{DR}$ of the hard disks and the target temperature. In some embodiments, the temperature $T_{DR}$ of the hard disks may be a highest temperature of the hard disks or an average temperature of the hard disks. In other embodiments, the temperature $T_{DR}$ of the hard disks may also be other available temperature of the hard disks. PID control is a conventional industrial control method, which will not be detailed herein.

At 705, in response to the read signal indicates that the hard disk assembly 202 is located beyond the predetermined position range, a temperature $T_{IN}$ at a wind inlet side of the hard disk assembly 202 is compared with the first threshold. In the example shown in FIGS. 6A-6E, the read signals 0011, 0111 and 1111 indicate that the hard disk assembly 202 is located beyond the predetermined position range. In this case, two or more rows of hard disks 206 in the hard disk assembly 202 have been drawn out of the chassis 201.

At 706, in response to the temperature $T_{IN}$ at the wind inlet side being higher than the first threshold, the rotating speed of the fan 203 is adjusted to a first predetermined rotating speed. The first rotating speed is greater than the rotating speed of the fan 203 when the hard disk assembly 202 is located within the predetermined position range. Here, the temperature $T_{IN}$ at the wind inlet side of the hard disk assembly 202 refers to the temperature at the side of the hard disk assembly 202 close to the fan 203. In some embodiments, the first threshold value is 35°, while in other embodiments, the first threshold may be higher or lower according to actual needs. In some embodiments, the first predetermined rotating speed is the maximum rotating speed of the fan 203, while in other embodiments, the first predetermined rotating speed may be lower than the maximum rotating speed of the fan 203.

At 707, in response to the temperature $T_{IN}$ at the wind inlet side being lower than or equal to the first threshold, the temperature $T_{DR}$ of the hard disks is compared with a second threshold. Here, the second threshold is larger than the first threshold. In some embodiments, the second threshold is 55° C. However, in other embodiments, the second threshold may be higher or lower according to the actual needs.

At 708, in response to the temperature $T_{DR}$ of the hard disks being larger than the second threshold, the rotating speed of the fan 203 is adjusted to a second predetermined rotating speed. The second predetermined rotating speed is greater than the rotating speed of the fan 203 when the hard disk assembly 202 is located within the predetermined position range but lower than the first predetermined rotating speed. In some embodiments, the second predetermined rotating speed is 80% of the maximum rotating speed of the fan 203. However, in other embodiments, the second predetermined rotating speed may be higher or lower than 80% of the maximum rotating speed of the fan 203.

In case that the temperature $T_{DR}$ of the hard disks is lower than or equal to the second threshold, the method 700 compares the temperature $T_{DR}$ of the hard disks with the target temperature at 703, and subsequently performs PID (Proportion-Integration-Differentiation) control based on a result of the comparing between the temperature $T_{DR}$ of the hard disks and the target temperature at 704.

In some embodiments, the method 700 further comprises generating an alarm signal in response to the read signal indicating that the hard disk assembly 202 is located beyond the predetermined position range. In this way, an indication that the hard disk assembly 202 is drawn out of the chassis 201 may be provided to an operator.

In some embodiments, the method 700 further comprises: in response to the read signal being a fault signal, reporting that a fault exists in the hard disk assembly 202. In this way, the operator may be notified that the hard disk assembly 202 has a fault, so as to facilitate timely processing.

The method 700 for managing a storage device as shown in FIG. 7 is only exemplary. Those skilled in the art may contemplate other solutions according to the teachings of this disclosure. For example, in some embodiments, a signal (for example an analog signal) indicating a real-time position of the hard disk assembly 202 relative to the chassis 201 may be obtained, and based on this signal, the wind speed can be continuously adjusted. For example, in one embodiment, the method for managing a storage device may comprise: in response to the signal indicating that the hard disk assembly 202 being drawn out of the chassis 201, increasing the rotating speed of the fan 203; and in response to the signal indicating that the hard disk assembly 202 is pushed into the chassis 201, decreasing the rotating speed of the fan 203.

In some embodiments, the method 100 for managing a storage device may also comprise: in response to the read signal indicating that at least a part of hard disks in the hard disk assembly 202 are located outside of the chassis 201, migrating key data stored in the hard disks outside of the chassis 201 into the hard disks within the chassis 201. In this way, even the hard disks outside of the chassis 201 fail due to overheat, the key data can also be maintained undamaged.

In the embodiments of the present disclosure, the storage device 200 may also comprise a processor configured to execute the method 100 described above. In some embodiments, the processor is configured to: receive a signal indicating a position of the hard disk assembly 202 relative to the chassis 201; and control the rotating speed of the fan 203 based at least in part on the signal.

Alternatively or additionally, the processor is configured to: in response to the signal indicating that the hard disk assembly 202 is drawn out of the chassis 201, increase the rotating speed of the fan 203; and in response to the signal indicating that the hard disk assembly 202 is pushed into the chassis 201, decrease the rotating speed of the fan 203.

Alternatively or additionally, the processor is configured to: in response to the signal indicating that the hard disk assembly 202 is located within the predetermined position range, compare the temperature of the hard disks in the hard disk assembly 202 with the target temperature; and perform PID (Proportion-Integration-Differentiation) control based on a result of the comparing between the temperature of the hard disks and the target temperature.

Alternatively or additionally, the processor is configured to: in response to the signal indicating that the hard disk assembly 202 is located beyond the predetermined position range, compare a temperature at a wind inlet side of the hard disk assembly 202 with the first threshold; and in response to the temperate at the wind inlet side being higher than the first threshold, adjust the rotating speed of the fan 203 to the first predetermined rotating speed, the first rotating speed being higher than the rotating speed of the fan 203 when the hard disk assembly 202 is located within the predetermined position range.

Alternatively or additionally, the processor is configured to: in response to the temperature at the wind inlet side being lower than or equal to the first threshold, compare the temperature of the hard disks with a second threshold, the second threshold being higher than the first threshold; and in response to the temperature of the hard disks being higher than the second threshold, adjusting the rotating speed of the fan 203 to the second predetermined rotating speed, the second predetermined rotating speed being higher than the rotating speed of the fan 203 when the hard disk assembly 202 is located within the predetermined position range and being lower than the first predetermined rotating speed.

Alternatively or additionally, the processor is configured to: in response to the temperature of the hard disks being smaller than or equal to the second threshold, compare the temperature of the hard disks and the target temperature; and perform the PID control on the rotating speed of the fan 203 based on a result of comparing between the temperature of the hard disks and the target temperature.

Alternatively or additionally, the processor is configured to: in response to the signal indicating that the hard disk assembly 202 is located beyond the predetermined position range, generate an alarm signal.

Alternatively or additionally, the processor is configured to: in response to the signal indicating that at least a part of hard disks in the hard disk assembly 202 are located outside of the chassis 201, migrate key data stored in the hard disks outside of the chassis 201 into the hard disks within the chassis 201.

Various embodiments of the present disclosure have been described above. However, the illustrations above are only exemplary, not exhaustive; besides, the present disclosure is not limited to various embodiments as disclosed. Numerous modifications and variations will be apparent to those of ordinary skill in the art without departing from the scope and spirit of the illustrated embodiments. The choice of terminology used herein is intended to best explain the principles of the embodiments, practical applications or improvements of the technologies in the market, or to enable other persons of ordinary skill in the art to understand the embodiments disclosed herein.

We claim:

1. A method for managing a storage device, the storage device including a chassis and a hard disk assembly, the method comprising:

receiving a signal indicating a position of the hard disk assembly relative to the chassis, the hard disk assembly being slidably coupled to the chassis, and the signal being generated by an electromechanical element disposed on the hard disk assembly; and controlling a rotating speed of a fan based at least in part on the signal, the fan being disposed within the chassis and configured to blow wind to the hard disk assembly; wherein the controlling comprises:

in response to the signal indicating that the hard disk assembly is located within a predetermined position range, comparing a temperature of hard disks in the hard disk assembly with a target temperature; and performing proportion-integration-differentiation (PID) control on the rotating speed of the fan based on a result of comparing the temperature of the hard disks and the target temperature.

2. The method according to claim 1, wherein the controlling further comprises:

in response to the signal indicating that the hard disk assembly is located beyond the predetermined position range, comparing a temperature at a wind inlet side of the hard disk assembly with a first threshold; and in response to the temperature at the wind inlet side being higher than the first threshold, adjusting the rotating speed of the fan to a first predetermined rotating speed, the first predetermined rotating speed being higher than the rotating speed of the fan when the hard disk assembly is located within the predetermined position range.

3. The method according to claim 2, wherein the controlling further comprises:

in response to the temperature at the wind inlet side being lower than or equal to the first threshold, comparing the temperature of the hard disks with a second threshold, the second threshold being higher than the first threshold; and in response to the temperature of the hard disks being higher than the second threshold, adjusting the rotating speed of the fan to a second predetermined rotating speed, the second predetermined rotating speed being higher than the rotating speed of the fan when the hard disk assembly is located within the predetermined position range and being lower than the first predetermined rotating speed.

4. The method according to claim 3, wherein the controlling further comprises:

in response to the temperature of the hard disks being lower than or equal to the second threshold, comparing the temperature of the hard disks with the target temperature; and performing the PID control on the rotating speed of the fan based on a result of comparing the temperature of the hard disks and the target temperature.

5. The method according to claim 1, wherein the controlling further comprises:

in response to the signal indicating that the hard disk assembly is located beyond the predetermined position range, generating an alarm signal.

6. The method according to claim 1, further comprising:

in response to the signal indicating that at least a part of hard disks in the hard disk assembly is located outside of the chassis, migrating key data stored in the hard disks outside of the chassis to the hard disks within the chassis.

7. The method according to claim 1, the electromechanical element includes a plurality of elastic buttons.

8. The method according to claim 7, wherein the hard disk assembly includes a hard disk drawer and a plurality of circuit boards, the plurality of circuit boards being arranged in the hard disk drawer at intervals for inserting hard disks, and wherein the plurality of elastic buttons are arranged on a side wall of the hard disk drawer and electrically connected to corresponding circuit boards.

9. A method for managing a storage device, the storage device including a chassis and a hard disk assembly, the method comprising:

receiving a signal indicating a position of the hard disk assembly relative to the chassis, the hard disk assembly being slidably coupled to the chassis, and the signal being generated by an electromechanical element disposed on the hard disk assembly; and controlling a rotating speed of a fan based at least in part on the signal, the fan being disposed within the chassis and configured to blow wind to the hard disk assembly; wherein the controlling comprises:

in response to the signal indicating that the hard disk assembly is drawn out of the chassis, increasing the rotating speed of the fan; and in response to the signal indicating that the hard disk assembly is pushed into the chassis, decreasing the rotating speed of the fan.

10. A storage device comprising:

a chassis;

a hard disk assembly being slidably coupled to the chassis and having an electromechanical element disposed thereon, the electromechanical element being configured to generate a signal indicating a position of the hard disk assembly relative to the chassis;

a fan disposed in the chassis and configured to blow wind to the hard disk assembly; and a processor configured to:

receive the signal; and control a rotating speed of the fan based at least in part on the signal;

wherein the processor is further configured to:

in response to the signal indicating that the hard disk assembly is located within a predetermined position range, compare a temperature of hard disks in the hard disk assembly with a target temperature; and perform proportion-integration-differentiation (PID) control on the rotating speed of the fan based on a result of comparing the temperature of the hard disks and the target temperature.

11. The storage device according to claim 10, wherein the processor is further configured to:

in response to the signal indicating that the hard disk assembly is located beyond the predetermined position range, compare a temperature at a wind inlet side of the hard disk assembly with a first threshold; and in response to the temperature at the wind inlet side being higher than the first threshold, adjust the rotating speed of the fan to a first predetermined rotating speed, the first predetermined rotating speed being higher than the rotating speed of the fan when the hard disk assembly is located within the predetermined position range.

12. The storage device according to claim 11, wherein the processor is further configured to:

in response to the temperature at the wind inlet side being lower than or equal to the first threshold, compare the temperature of the hard disks with a second threshold, the second threshold being higher than the first threshold; and in response to the temperature of the hard disks being higher than the second threshold, adjust the rotating speed of the fan to a second predetermined rotating speed, the second predetermined rotating speed being higher than the rotating speed of the fan when the hard disk assembly is located within the predetermined position range and being lower than the first predetermined rotating speed.

13. The storage device according to claim 12, wherein the processor is further configured to:
   in response to the temperature of the hard disks being lower than or equal to the second threshold, compare the temperature of the hard disks with the target temperature; and
   perform the PID control on the rotating speed of the fan based on a result of comparing the temperature of the hard disks and the target temperature.

14. The storage device according to claim 10, wherein the processor is further configured to:
   in response to the signal indicating that the hard disk assembly is located beyond the predetermined position range, generate an alarm signal.

15. The storage device according to claim 10, wherein the processor is further configured to:
   in response to the signal indicating that at least a part of hard disks in the hard disk assembly is located outside of the chassis, migrate key data stored in the hard disks outside of the chassis to the hard disks within the chassis.

16. The storage device according to claim 10, the electromechanical element includes a plurality of elastic buttons.

17. The storage device according to claim 16, wherein the hard disk assembly includes a hard disk drawer and a plurality of circuit boards, the plurality of circuit boards being arranged in the hard disk drawer at intervals for inserting hard disks, and
   wherein the plurality of elastic buttons are arranged on a side wall of the hard disk drawer and electrically connected to corresponding circuit boards.

18. A storage device comprising:
   a chassis;
   a hard disk assembly being slidably coupled to the chassis and having an electromechanical element disposed thereon, the electromechanical element being configured to generate a signal indicating a position of the hard disk assembly relative to the chassis;
   a fan disposed in the chassis and configured to blow wind to the hard disk assembly; and
   a processor configured to:
      receive the signal; and
      control a rotating speed of the fan based at least in part on the signal;
   wherein the processor is further configured to:
      in response to the signal indicating that the hard disk assembly is drawn out of the chassis, increase the rotating speed of the fan; and
      in response to the signal indicating that the hard disk assembly is pushed into the chassis, decrease the rotating speed of the fan.

19. A method for managing a storage device, the storage device including a chassis and a hard disk assembly, the method comprising:
   receiving a signal indicating a position of the hard disk assembly relative to the chassis, the hard disk assembly being slidably coupled to the chassis, and the signal being generated by an electromechanical element disposed on the hard disk assembly; and
   controlling a rotating speed of a fan based at least in part on the signal, the fan being disposed within the chassis and configured to blow wind to the hard disk assembly;
   wherein controlling the rotating speed of the fan includes:
      in response to the signal indicating that the hard disk assembly is slidably coupled with the chassis at a first position, directing the fan to rotate at a first rotational speed, and
      in response to the signal indicating that the hard disk assembly is slidably coupled with the chassis at a second position that is different from the first position, directing the fan to rotate at a second rotational speed that is different from the first rotational speed;
   wherein the hard disk assembly is closer to the fan when the hard disk assembly is at a first position, and farther from the fan when the hard disk assembly is at a second position; and
   wherein the second rotational speed is faster than the first rotational speed.

* * * * *